United States Patent
Silveria et al.

(10) Patent No.: US 11,182,933 B2
(45) Date of Patent: Nov. 23, 2021

(54) INDICATION OF EXTENT TO WHICH COLOR-BLIND PERSON IS UNABLE TO DISTINGUISH FEATURES WITHIN DIGITAL IMAGE

(71) Applicant: Hewlett-Packard Development Company, L.P., Spring, TX (US)

(72) Inventors: Thaua Garcia Silveria, Porto Alegre (BR); Leandro Cado, Porto Alegre (BR); Ricardo Redin, Porto Alegre (BR); Ricardo Moreira, Porto Alegre (BR); Luica Maciel, Porto Alegre (BR); Alessandro Hunhoff, Porto Alegre (BR); Ricardo Staudt, Porto Alegre (BR); Alan Aguirre, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/764,070

(22) PCT Filed: Nov. 28, 2017

(86) PCT No.: PCT/US2017/063480
§ 371 (c)(1),
(2) Date: May 14, 2020

(87) PCT Pub. No.: WO2019/108166
PCT Pub. Date: Jun. 6, 2019

(65) Prior Publication Data
US 2020/0372690 A1    Nov. 26, 2020

(51) Int. Cl.
*G06T 11/00* (2006.01)
*G06T 7/90* (2017.01)
*A61B 3/06* (2006.01)

(52) U.S. Cl.
CPC .............. *G06T 11/001* (2013.01); *G06T 7/90* (2017.01); *G06T 2207/10024* (2013.01)

(58) Field of Classification Search
CPC combination set(s) only.
See application file for complete search history.

(56) References Cited

U.S. PATENT DOCUMENTS

| | | |
|---|---|---|
| 5,552,842 A | 9/1996 | Ginsburg |
| 8,406,528 B1 | 3/2013 | Hatwich et al. |

(Continued)

FOREIGN PATENT DOCUMENTS

EP    2869328 A1    5/2015

OTHER PUBLICATIONS

Bennett, M. et al., A Method for the Automatic Anaiysis of Colour Category Pixel Shifts During Dichromatic Vision. 2006, https://link.springer.com/ ~ 2 pages.

(Continued)

*Primary Examiner* — Wesner Sajous
(74) *Attorney, Agent, or Firm* — Michael A Dryja

(57) ABSTRACT

A color blindness-simulating digital image is generated from an original digital image. Wireframe versions of the original digital image and the color blindness-simulating digital image can be generated. A comparison digital image between the color blindness-simulating digital image and the original digital image is generated, such as by comparing the wireframe versions of the original digital image and the color blindness-simulating digital image to one another. The comparison digital image is indicative of the extent to which a color-blind person is unable to distinguish features within the original digital image.

15 Claims, 3 Drawing Sheets

(56) References Cited

U.S. PATENT DOCUMENTS

| | | |
|---|---|---|
| 9,288,531 B2 | 3/2016 | Woods et al. |
| 9,547,804 B2 | 1/2017 | Nirenberg et al. |
| 2011/0142335 A1 | 6/2011 | Ghanem |
| 2012/0147163 A1 | 6/2012 | Kaminsky |
| 2014/0270516 A1* | 9/2014 | Wang .................. G06T 11/001 382/167 |
| 2016/0148354 A1 | 5/2016 | Finlayson |
| 2016/0155344 A1* | 6/2016 | Mihai .................. G06F 40/197 434/365 |
| 2018/0043257 A1* | 2/2018 | Stevens .................. A63F 13/79 |
| 2020/0020138 A1* | 1/2020 | Smith .................... G06F 3/013 |

OTHER PUBLICATIONS

Navada et al., An Image Processing Technique for Color Detection and Distinguish Patterns with Similar Color: An Aid for Color Blind People. 2014, http://ieeexplore.ieee.org/ ~ 5 pages.

Laplante Phillip A Et al: Wireframe In: Comprehensive Dictionary of Electronical Engineering, Jan. 1, 2005, pp. 746-746 (3 pages).

* cited by examiner

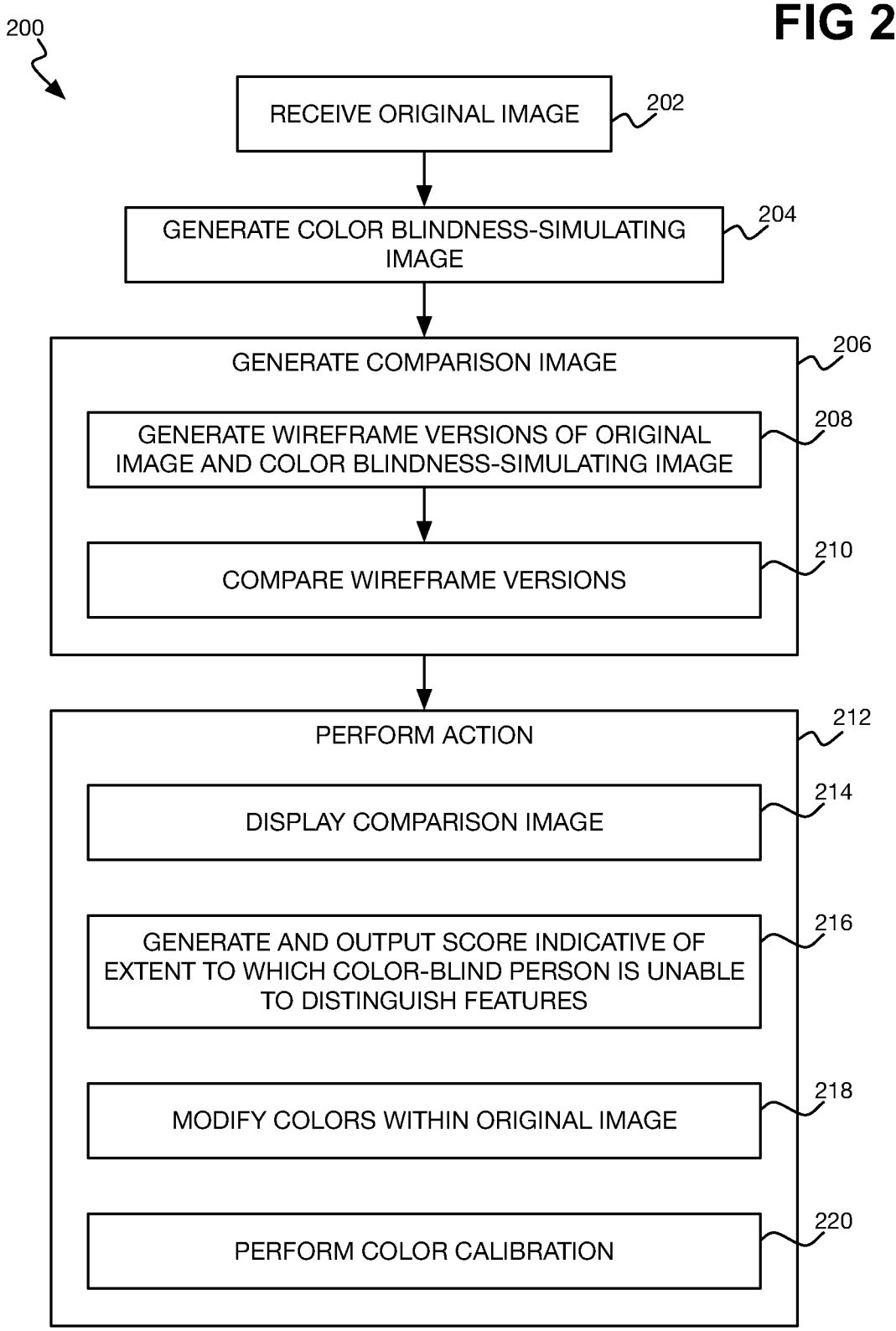

INDICATION OF EXTENT TO WHICH COLOR-BLIND PERSON IS UNABLE TO DISTINGUISH FEATURES WITHIN DIGITAL IMAGE

BACKGROUND

Content creators frequently create digital visual content, such as digital images, for others to view. The digital visual content may be electronically displayed, such as on display devices ranging from smartphones, tablet computing devices, and computers on the one hand to large-scale public displays on the other. The digital visual content may be printed using printing devices, in the form of books, magazines, as well as billboards and other large-scale hardcopy. In either case, the intended viewing audience can view the created digital images.

BRIEF DESCRIPTION OF THE DRAWINGS

FIG. 2 is a flowchart of an example method for providing an indication of the extent to which a color-blind person is unable to distinguish features within an image.

DETAILED DESCRIPTION

As noted in the background, content creators can create digital images that others view upon electronic display of the images, or after hardcopies of the images have been printed. An intended audience of a particular digital image may be quite large and varied. A content creator may therefore have to take into account differing physical limitations of the viewing audience of a digital image.

One physical limitation that a percentage of the population has is color blindness. Color blindness is the decreased ability to see color or differences in color. Although most people have heard of color blindness, content creators may not consciously consider how a color-blind user person may see their digital images while creating the images. Therefore, a content creator may create a digital image having features that a color-blind person may be unable to distinguish due to the images having colors that the color-blind person is unable to discern from one another.

Techniques described herein provide for an indication of the extent to which a color-blind person is unable to distinguish features within a digital image. From an original image, a color blindness-simulating digital image is generated. The color blindness-simulating digital image modifies the colors of the original image to approximate how a color-blind person sees the digital image.

A comparison or differential image between the original image and the color blindness-simulating image is generated. For instance, the comparison image may be generated by applying an image-comparison technique to wireframe versions of the original image and the color blindness-simulating image. The comparison image is indicative of the extent to which a color-blind person is unable to distinguish features within the original digital image.

A content creator may view the comparison image to discern the areas, parts, or features of the original image that a color-blind person is unable to easily distinguish. The content creator may thus then modify the original image so that the colors of these areas, parts, or features are less likely to be indistinguishable by a color-blind person. The techniques described herein therefore may not just show the content creator a color blindness-simulated version of a digital image, but instead or additionally indicate, via the comparison image, the areas of the digital image that a color-blind person is likely to have difficulty discerning.

Figure 1E:
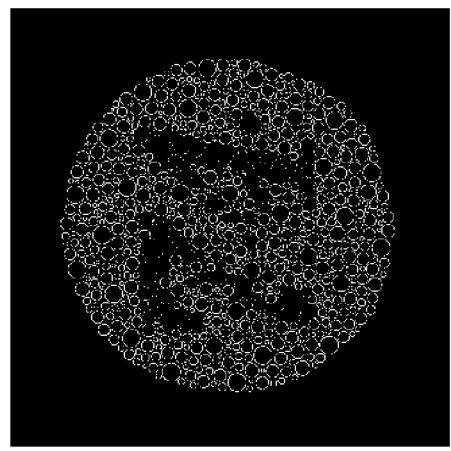
FIGS. 1A, 1B, 1C, 1D, and 1E are diagrams of example images illustrating the process by which the extent to which a color-blind person is unable to distinguish features within an original image can be indicated within a comparison image.
Figure 1C:
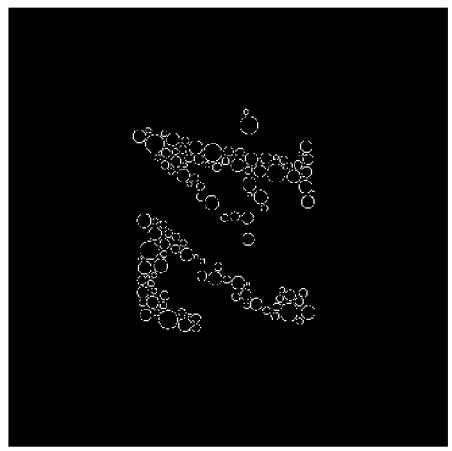
Figure 1D:
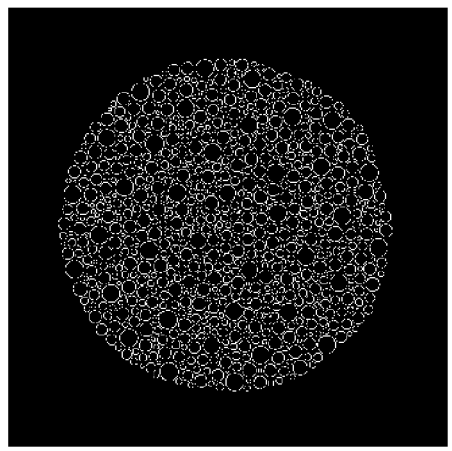
Figure 1A:
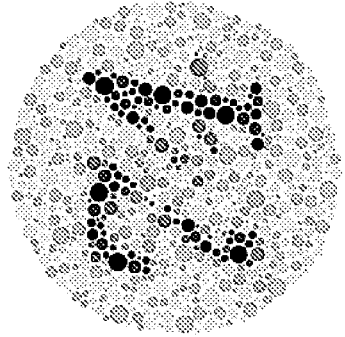

FIGS. 1A-1E illustratively depict example performance of these techniques. FIG. 1A shows an example original digital image 100. The original image 100 includes a variety of differently colored circles. Specifically, the circles forming the number "74" are in colors different in type or family than the colors of the other circles of the image 100. A color-blind person may be unable to distinguish the colors of the circles forming the number "74" from the colors of the other circles of the image 100 in the example of FIG. 1A.

Figure 1B:
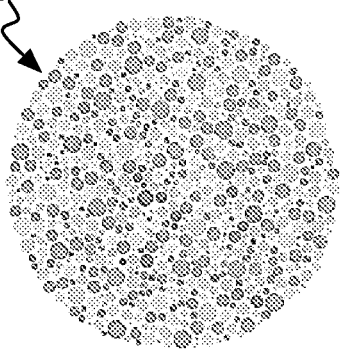

FIG. 1B shows an example color blindness-simulating digital image 110 that is generated from the original image 100. That is, the color blindness-simulating image 110 is a version of the original image 100 that simulates how a color-blind person sees the original image 100. The circles forming the number "74" in the image 110 are in colors more similar to those of the other circles of the image 110 than as compared to in the image 100. This is because a color-blind person sees the colors of the circles forming the number "74" in the image 100 as similar to those of the other circles in the image 100, such that in the image 110, all the circles are of similar color. In the color blindness-simulating image 110, then, the number "74" is difficult to discern by a person who is not color blind, since the image 110 simulates how a color-blind person sees the image 100.

FIGS. 1C and 1D show example wireframe versions 120 and 130 of the digital images 100 and 110, respectively. For instance, an edge-detection algorithm may be applied to the images 100 and 110 to generate the wireframe versions 120 and 130 thereof. In the wireframe version 120 of FIG. 1C of the original image 100 of FIG. 1A, the number "74" is readily apparent; the edge-detection algorithm detected the change in the colors of the circles forming the number "74" from the colors of the other circles as the most prominent edges in the image 100. By comparison, in the wireframe version 130 of FIG. 1D of the color blindness-simulating image 110 of FIG. 1B, the number "74" is not apparent; the edge-detection algorithm instead detected the changes in the colors of the circles from the white background as the most prominent edges in the image 130.

FIG. 1E shows an example comparison digital image 140 of the differences between the wireframe versions 120 and 130 of the digital images 100 and 110, respectively. More generally, the comparison digital image 140 can be considered a differential image generated by applying an image-comparison algorithm to the images 100 and 110, or versions thereof. The comparison image 140 indicates the extent to which a color-blind person is unable to distinguish features within the original image 100.

For example, in the comparison image 140, the outline of the number "74" is readily apparent against a background of hollow circles. Therefore, a content creator who created the original image 100 can discern upon inspection of the comparison image 140 that a color-blind person will be unable to distinguish the number "74" from the background of the image 100. The content creator may thus change the colors of the circles forming the number "74" relative to the colors of the circles of the background of the image 100.

As such, the comparison image 140 permits the content creator to learn the extent to which a color-blind person is unable to distinguish features within the original image 100, such as the number "74." If the number "74" in the original image 100 had colors that a color-blind person were able to perfectly discern from the colors of the background, the color blindness-simulation image 110 may have been identical to the original image 100, or at least the wireframe versions 120 and 130 may have been identical to one another. The comparison image 140 would then have been empty or blank, indicating that the original image 100 did not contain any features that a color-blind person is unable to distinguish due to the color-blind person being unable to distinguish among colors of features that are adjacent to one another (such as the number "74" relative to the background). That is, when a color-blind person is completely able to distinguish features within the original image 100, the comparison 140 may be empty or blank.

The comparison image 140, in other words, highlights the features of the original image 100 that a color-blind person is less able to distinguish within the original image 100. The comparison image 140 does not include image features that are identical between the wireframe versions 120 and 130 of the images 100 and 110, since the comparison image 140 can be a differential image of the wireframe version 130 of the image 110 relative to the wireframe version 120 of the image 100. The wireframe versions 120 and 130 thus differ as to the features within the original image 100 that a color-blind person is unable to distinguish, and increasingly differ in correspondence with a color-blind person's increasing inability to discern these features, which is then reflected within the comparison image 140.

FIG. 2 shows an example method 200 for indicating the extent to which a color-blind person is unable to distinguish features within an original image. The method 200 can be implemented as program code stored on a non-transitory computer-readable medium, and that is executed by a processor of a computing device. The method 200 includes receiving an original digital image (202). For instance, a user who is a content creator may have created an image using a software tool. The image is referred to as an original image to distinguish it from other images that are generated based on, using, or from the original image. The image is a digital image in that it is encoded in a digital format, such as JPG, PNG, and so on.

The method 200 includes generating a color blindness-simulating digital image from the original digital image (204). The color blindness-simulating digital image is a version of the original digital image that simulates or approximates how a color-blind person sees the original image. Because there are different types of color blindness, the color blindness-simulating image may simulate how color-blind people having the same type of color blindness can see the image. As such, the color blindness-simulating digital image is not a subjective image (i.e., it is not subjectively determined), but rather is an objective image (i.e., it is objectively determined), since the type of and the degree of color blindness of any particular color-blind person can be objectively measured.

The method 200 can generate the color blindness-simulating digital image from the original digital image according to any of a number of different techniques. One such technique is described in U.S. Pat. No. 8,350,869, entitled "Preview for Colorblind." Another such technique is provided at the Internet web site www.color-blindness.com/ coblis-color-blindness-simulator/. A third such technique is provided at the Internet web site vischeck.com/vischeck/ vischeckImage.php.

The method 200 includes generating a comparison digital image between the color blindness-simulating digital image and the original digital image (206). The comparison image indicates the extent to which a color-blind person is unable to distinguish image features within the original image. The comparison digital image thus can highlight features of the original image that a color-blind person is less able to distinguish within the original image. The comparison digital image can be a differential image, which indicates the differences between the color blindness-simulating image and the original image. Such a differential image may include the image features that differ between the color blindness-simulating image and the original image, and omit the image features that are identical between these two images.

In one implementation, the method 200 can generate the comparison digital image by first generating wireframe versions of the original digital image and the color blindness-simulating digital image (208). The wireframe version of an input image can be generated by applying an edge-detection technique to the input image that generates an output image highlighting or including just the primary or most prominent edges of the input image. The method 200 then can compare the wireframe versions to one another to generate the comparison digital image (210). For instance, an image comparison image that generates an output image of the differences between two input images can be applied to the wireframe versions of the original image and the color blindness-simulating image.

The method 200 can include performing an action in relation to the comparison digital image that has been generated (212). In different implementations, performing the action can include one or more of the following. The method 200 may display the generated comparison image (214), so that the content creator is him or herself able to discern the image features of the original image that a color-blind person is less likely able to distinguish by inspecting the comparison image. The method 200 may generate and output a score indicative of the extent to which a color-blind person is unable to distinguish image features within the original image (216). For instance, the more pixels that are identified within the comparison image, the greater the score that the method 200 may generate.

The method 200 may modify the colors within the original digital image (218) to increase the ability of a color-blind person to distinguish features within the original image. For instance, the method 200 may change the colors of the original image's pixels corresponding to those identified within the comparison image. The method 200 may change the colors according to a color blindness model that can denote what a color a pixel should be based on the color(s) of its surrounding pixels, where the model may be in the form of a look-up table, for example.

The method 200 may perform color calibration of a printing device so that when the original image is printed using the printing device, the colors of the original image are printed in such a way as to increase the ability of a color-blind person to distinguish features within the image (220). For instance, the method 200 may identify which colors should be color calibrated as those colors of the original image's pixels corresponding to those identified within the comparison image. Therefore, rather than modifying the original image, the method 200 can instead color calibrate a printing device so that the original image's colors in question are modified during printing so that a color-blind person is able to distinguish the image's features. As such, image quality of the printed images is improved.

Figure 3:
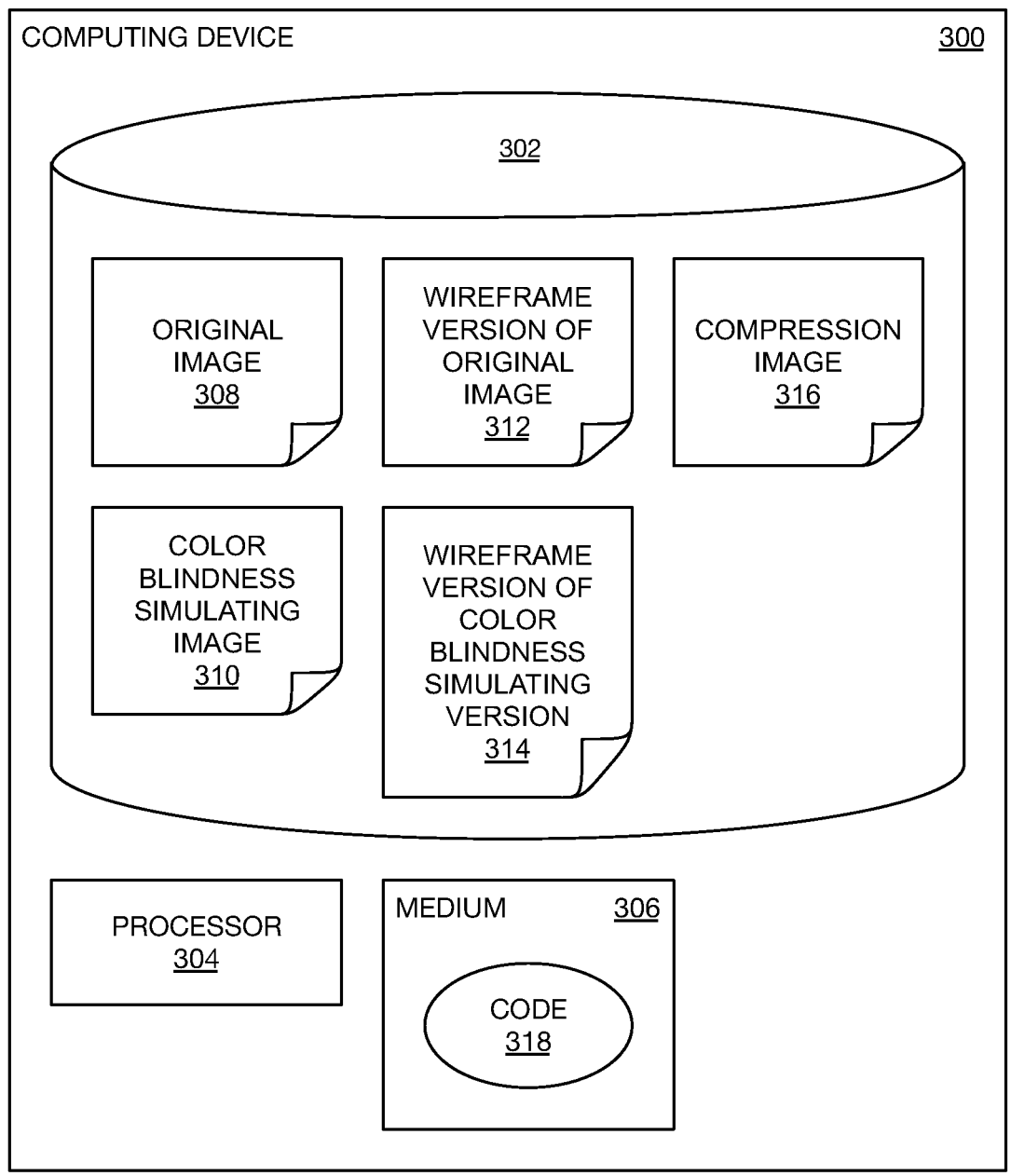
FIG. 3 is a diagram of an example computing device that can indicate the extent to which a color-blind person is unable to distinguish features within an image.

FIG. 3 shows an example computing device 300, which may be a computer. The computing device 300 can include a storage device 302, a processor 304, and a non-transitory computer-readable data storage medium 306. The storage device 302 can store data representing an original digital image 308 and a color blindness-simulating digital image 310 that is generated from the original digital image 308. The storage device 302 can store data representing wireframe versions 312 and 324 of the digital images 308 and 310, respectively. The storage device 302 can store data representing a comparison image 316 that differentially compares the images 308 and 310, such as the wireframe versions 312 and 314 thereof. The medium 306 can store program code 318 that the processor 304 executes to generate the color blindness-simulating image 310 from the original image 308, to generate the wireframe versions 312 and 314 of the images 308 and 310, and to generate the comparison image 316. That is, the processor 304 can execute the program code 318 to perform the method 200 that has been described.

Techniques described herein thus generate a comparison image that highlights the image features of an original image that a color-blind person is less able to distinguish. Rather than just generating a color blindness-simulating version of the original image, in other words, the techniques described herein generate a comparison image using such a color blindness-simulation image and the original image. As such, a content creator can inspect the comparison image to assess the image features of the original image that may have to have their colors modified to improve the ability of a color-blind person to distinguish these features.

We claim:

1. A method comprising:
generating, by a computing device, a color blindness-simulating digital image from an original digital image;
generating, by the computing device, a comparison digital image between the color blindness-simulating digital image and the original digital image, by:
generating a wireframe version of the original digital image;
generating a wireframe version of the blindness-simulating digital image; and
comparing the wireframe versions of the original digital image and the color blindness-simulating digital image to generate the comparison digital image, the comparison digital image indicative of an extent to which a color-blind person is unable to distinguish features within the original digital image; and
modifying, by the computing device, colors within the original digital image to decrease the extent to which the color-blind person is unable to distinguish the features within the original digital image, based on the comparison digital image, by changing colors of pixels of the original digital image identified within the comparison digital image.

2. The method of claim 1, wherein the comparison digital image highlights the features of the original digital image that the color-blind person is less able to distinguish within the original digital image.

3. The method of claim 1, wherein generating the comparison digital image comprises:
generating a differential digital image between the color blindness-simulating digital image and the original digital image.

4. The method of claim 3, wherein the differential digital image includes image features that differ between the original digital image and the color blindness-simulating digital image,
and wherein the differential digital image does not include image features that are identical between the original digital image and the color blindness-simulating.

5. The method of claim 4, wherein the differential digital image is a blank digital image if the color-blind person is completely able to distinguish the features within the original digital image.

6. The method of claim 1, further comprising:
displaying the generated comparison digital image.

7. The method of claim 1, further comprising:
generating, by the computing device, a score indicative of the extent to which the color-blind person is unable to distinguish the features within the original digital image, from the comparison digital image and; and
outputting, by the computing device, the score.

8. The method of claim 1, further comprising:
performing, by the computing device, color calibration of a printing device, to decrease the extent to which the color-blind person is unable to distinguish the features within the original digital image upon printing of the original digital image by the printing device, based on the comparison digital image.

9. A non-transitory computer-readable storage medium storing program code executable by a processor to:
compare a wireframe version of an original digital image to a wireframe version of a color blindness-simulating digital image generated from the original digital image;
generate a differential image resulting from comparing the wireframe versions of the original digital image and the color blindness-simulating digital image; and
modify colors within the original digital image to decrease the extent to which the color-blind person is unable to distinguish features within the original digital image, based on the comparison digital image, by changing colors of pixels of the original digital image identified within the comparison digital image.

10. The non-transitory computer-readable data storage medium of claim 9, wherein the program code is executable by the processor to further:
generate the color blindness-simulating digital image from the original digital image, the color blindness-simulating digital image approximating an extent to which a color-blind person is unable to distinguish the features within the original digital image.

11. The non-transitory computer-readable data storage medium of claim 9, wherein the program code is executable by the processor to further:
generate the wireframe version of the original digital image; and
generate the wireframe version of the color blindness-simulating digital image,
wherein the wireframe versions of the original digital image and the color blindness-simulating digital image differ at the features within the original digital image that a color-blind person is unable to distinguish.

12. The non-transitory computer-readable data storage medium of claim 11, wherein the wireframe versions of the original digital image and the color blindness-simulating digital image increasingly differ in correspondence with an increasing inability of color-blind person to distinguish the features within the original digital image.

13. The non-transitory computer-readable data storage medium of claim 9, wherein the program code is executable by the processor to further:

generate a score indicative of the extent to which the color-blind person is unable to distinguish the features within the original digital image, from the comparison digital image and; and output the score.

14. A computing system comprising:

a storage device to store an original digital image, a color blindness-simulating digital image, a wireframe version of the original digital image, a wireframe version of the color blindness-simulating digital image, and a comparison image;

a processor; and a non-transitory computer-readable storing program code executable by the processor to:

generate the color blindness-simulating digital image by modifying colors of the original digital image in approximation of a color-blind person's inability to distinguish features within the original digital image;

generate the wireframe versions of the original digital image and the color blindness-simulating digital image;

generate the comparison digital image that differentially compares the wireframe versions of the original digital image and the color blindness-simulating digital image to one another; and modify colors within the original digital image to decrease an extent to which the color-blind person is unable to distinguish the features within the original digital image, based on the comparison digital image, by changing colors of pixels of the original digital image identified within the comparison digital image.

15. The computing system of claim 14, wherein the program code is executable by the processor to further:

generate a score indicative of the extent to which the color-blind person is unable to distinguish the features within the original digital image, from the comparison digital image and; and output the score.

\* \* \* \* \*